(12) United States Patent
Wilkinson

(10) Patent No.: US 7,167,287 B1
(45) Date of Patent: Jan. 23, 2007

(54) HOLOGRAM IMAGING DEVICE AND METHOD OF USING SAME

(76) Inventor: Joseph N. Wilkinson, Box 1969, Mammoth Lakes, CA (US) 93546

( * ) Notice: Subject to any disclaimer, the term of this patent is extended or adjusted under 35 U.S.C. 154(b) by 22 days.

(21) Appl. No.: 11/080,916

(22) Filed: Mar. 14, 2005

Related U.S. Application Data

(60) Provisional application No. 60/553,293, filed on Mar. 13, 2004.

(51) Int. Cl.
*G03H 1/03* (2006.01)
(52) U.S. Cl. .............................. 359/35; 359/2; 359/27
(58) Field of Classification Search ............... 359/2, 359/26, 27, 35
See application file for complete search history.

(56) References Cited

U.S. PATENT DOCUMENTS 3,915,551 A * 10/1975 Silverman et al. ............ 359/26
6,370,268 B1 * 4/2002 Baba et al. .................. 382/154
2006/0054801 A1 * 3/2006 Cheng et al. ............ 250/237 R

* cited by examiner

*Primary Examiner*—Fayez G. Assaf
(74) *Attorney, Agent, or Firm*—Rob L. Phillips; Greenberg Traurig

(57) ABSTRACT

A hologram imaging device for obtaining hologram images and associated document markings which are commonly being used for document verification is disclosed. The imaging device comprises a housing defining an imaging chamber, camera, hologram light source, document light source and imaging platform. The hologram light source consists of a series of illumination devices (e.g., LEDs) adjustably mounted in an arc or semicircular arrangement. An LED controller regulates the state of the LEDs by controlling whether each LED is on or off and adjusting the intensity of each LED in an on position. During use, a document is secured within the housing by the imaging platform such that a hologram or other document marking is positioned beneath a camera lens. Then, the LEDs of the hologram light source are regulated by the LED controller such that different images and/or colors of the hologram may be captured by the camera. Consequently, a series of images and/or colors of the hologram are captured without the requirement of moving the hologram, camera or LED array during the process.

22 Claims, 4 Drawing Sheets

HOLOGRAM IMAGING DEVICE AND METHOD OF USING SAME

CROSS-REFERENCE TO RELATED APPLICATIONS

This application claims the benefit of Provisional Application No. 60/553,293 filed Mar. 13, 2004.

FIELD OF THE INVENTION

The embodiments of the present invention relate to a hologram imager. More particularly, the embodiments relate to a hologram imaging device for capturing holographic images and similar document markings which are commonly being used for document verification.

BACKGROUND

A hologram or optical variable device is a photographic image giving an observer a seemingly three-dimensional view of the represented object. The three-dimensional effect is produced by exposing a photographic recording medium to an interference pattern generated by a coherent beam of light (as from a laser) reflected from the subject, interacting with a beam directly from the source. The full three-dimensional effect requires illumination of the image with coherent light, but less perfect three-dimensional effects may also be observed with the hologram is illuminated with white light.

The use of holograms has become wide spread as a means for providing document verification. Important and/or sensitive documents, such as drivers licenses, credit cards and other identity and financial documents. Incorporate reflective type holograms. The security is predicted on the difficulty of reproducing holograms.

Hologram imagers have been in use for years. The prior art imagers utilize light sources, motion control means and image capturing devices to capture holographic images. The primary drawback of the prior art imaging devices is they do not capture the holographic images which are being used for the purpose of document verification. Another drawback is the required movement of the hologram, light source, lens or all of the same during image capture. Yet another drawback is the inability to image other document markings or related features associated with the document. Although the prior art devices may be suitable for the limited purpose they address, they are not suitable for capturing images of holograms and similar document markings being used for document verification.

Therefore, there continues to be the need for a holographic imaging device which captures images of holograms and similar document markings which are being used for document verification.

SUMMARY

The embodiments of the present invention substantially depart from the prior art design concepts thereby providing an apparatus for capturing holographic images and similar document markings which are being used for document verification.

Accordingly, a first embodiment of the present invention comprises a camera, hologram light source, document light source, imaging platform and housing which defines an imaging chamber. The camera acts as an imaging device and utilizes a charged coupled device (CCD) or complimentary metal oxide semiconductor (CMOS) image sensor with attached optics. The camera includes one or more controllers for controlling the sensor, optics and related camera circuitry.

The hologram light source consists of an adjustable array of illumination devices (e.g., light emitting diodes (LEDs)). Ideally, the LEDs are arranged in an arc or semicircular pattern. The document light source comprises an adjustable array of LEDs as well. Both light sources communicate with one or more controllers which control the state (i.e., on/off) and intensity of the LEDs during imaging. The LEDs of the document light source may emit light in infrared (IR), ultra-violet (UV) and/or visible light wavelengths.

The imaging platform secures a subject document in position for imaging. To facilitate proper document orientation, the imaging platform may include alignment and/or rotational controls. The imaging chamber contains the camera, hologram light source, document light source and imaging platform.

In this arrangement, the LEDs of the hologram light source are controlled in a user defined manner so that the camera may capture a series of images which illustrate the motion and/or change in color of the hologram. The user provides instructions to the hologram imaging device via an electronic user interface.

The objects of the embodiments of the present invention are too numerous to fully list herein. Nonetheless, several of the more apparent objects are listed below.

A first object of the embodiments of the present invention is to overcome the shortcomings and drawbacks associated with the prior art devices.

Another object of the embodiments of the present invention is to capture images of holograms and associated document verification markings.

Another object of the embodiments of the present invention is to capture images from a hologram that can be used for holographic or document verification.

Another object of the embodiments of the present invention is to capture holographic images without moving the subject document, camera or LED array during the imaging process.

Another object of the embodiments of the present invention is to capture holographic images using a light source comprising an LED array.

Another object of the embodiments of the present invention is to capture holographic images using the coordinated operation of a lighting source and an image capturing device (e.g., camera).

Another object of the embodiments of the present invention is to capture and record holographic images so that the images and/or colors of the hologram are visible.

Another object of the embodiments of the present invention is to capture images associated with the hologram.

Yet another object of the embodiments of the present invention is to utilize the captured holographic images to verify the authenticity of the subject hologram.

Other features, variations and embodiments will become evident from the detailed description, drawings and claims set forth below.

DETAILED DESCRIPTION

The detailed description below relates to a hologram imaging device. However, it should be understood that the embodiments disclosed hereinafter are not limited in their application to the details of construction and/or the arrangements of the components. The present invention is capable of being practiced in various manners. Also, it should be understood that the phraseology and terminology employed herein are for the purpose of describing the embodiments of the present invention and are not intended to limit the scope of the invention in any way.

Figure 1:
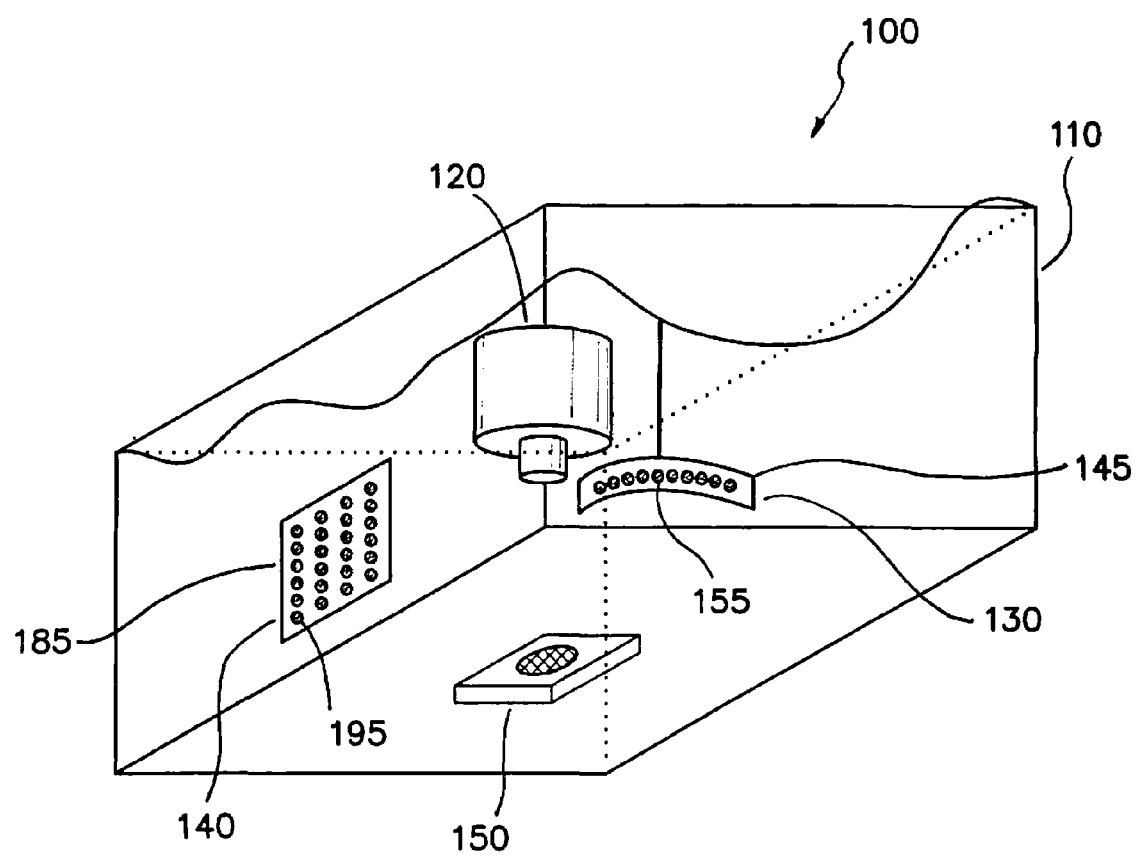
FIG. 1 shows a perspective view of a first embodiment of the preset invention.

Reference is now made to the figures wherein like parts are referred to by like numerals throughout. FIG. 1 shows a perspective view of a first embodiment of a hologram imaging device generally referred to by reference numeral 100. For purposes of this description, the internal components of the hologram imaging device 100 are visible through imaging device housing 110. In practice however, the housing 110 is fabricated of an opaque material to prevent excessive ambient light from entering the imaging chamber 150 defined by the housing 110. The housing 110 contains a camera 120, hologram light source 130, document light source 140 and imaging platform 150.

The camera 120 comprises either a CCD or CMOS image sensor and corresponding optics. The CCD or CMOS image sensors use a variety of technologies to transform a captured image into an electric image (electronic charge pattern). Thus, depending on the required use, a user may ultimately decide on the preferred image sensor. The camera 120 may be any camera suitable for the purposes referred to herein.

The camera 120 communicates with a sensor controller 125 and an optics controller 135. The optics controller 135 facilitates the transmission of captured images to a host or storage means 115. The camera 120 further includes automatic or manual controls for vertically positioning the camera 120 in reference to a document hologram or related images to be captured. Focusing a camera lens on the document image or related material to be imaged can be accomplished via manual or automatic means as well. To provide accurate results, once the camera 120 is focused on a hologram or similar document marking, it remains fixed during the image capturing process.

The image data output from camera 120 may be in the form of a frame data sequence utilizing a video signal standard such as the National Standard Television Committee (NTSC) or Phase Alternating Line (PAL). Alternatively, the output may be in the form of digital frame data.

Figure 2:
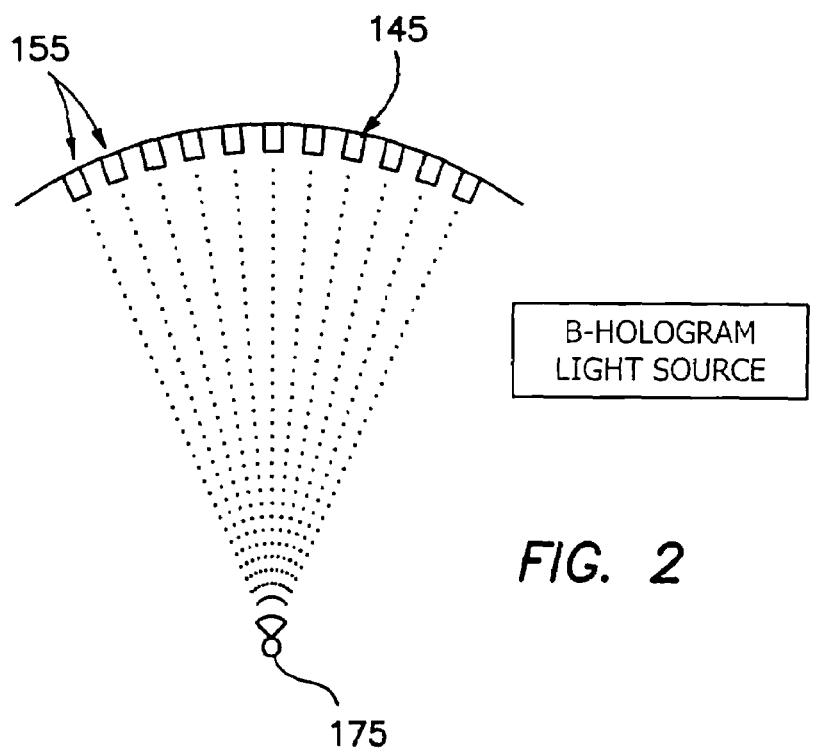
FIG. 2 shows a hologram light source.

As shown in FIGS. 1 and 2, the hologram light source 130 consists of a series of independent illumination devices mounted to an adjustable frame member 145. Ideally, the illumination devices are Light Emitting Diodes (LEDs) 155. The series of LEDs 155 is arranged in an arc or semicircular pattern in an elevated position with respect to the imaging platform 150. The state of the LEDs 155 is regulated by a first LED controller 165. The regulation of the LEDs 155 comprises on-off and intensity commands. Therefore, when an LED 155 is on, the controller also regulates the intensity.

FIG. 2 shows an overhead view of a first hologram light source 130, including the adjustable frame member 145, in an arc configuration. In this configuration, each LED 155 is equidistant from the hologram or related document marking to be captured or imaged. Also, the hologram or related document marking is positioned at the focal point 175 of the light being emitted by the LEDs 155. The position of the LEDs 155 may be adjusted in both the vertical and horizontal planes with respect to the subject hologram. In a second embodiment (not shown), a three-dimensional light source comprises multiple arrays of LEDs 155 arranged in a manner akin to a segment of a sphere's surface (i.e., lune). Again, the hologram is equidistance from each LED 155 and is positioned at the focal point thereof. While white light LEDs are ideal for the embodiments of the present invention, LEDs generating other wavelengths may be suitable for different holograms.

During use, the hologram light source 130 is positioned by a user and remains fixed during use. The first LED controller 165 then regulates the state (e.g., on/off) and intensity of the LEDs 155 to obtain the variations in the images and/or colors of the hologram. As set forth above, the hologram is positioned at a focal point 175 of the LED emitted light. However, in some cases it may be necessary to re-position the hologram at different locations to obtain the most accurate images of the hologram and/or its colors.

Figure 3:
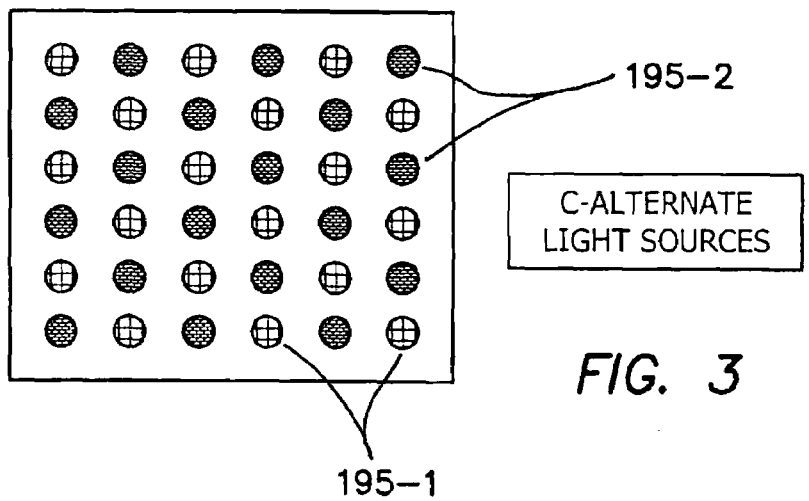
FIG. 3 shows a document light source.

The document light source 140 consists of a plurality of illumination devices mounted to an adjustable frame member 185. As with the hologram light source 130, ideally, the illumination devices are LEDs 195. As shown in FIG. 3, the LEDS 195 of the document light source 140 are arranged in a square pattern but may also be arranged in other conceivable patterns. The state of the LEDs 195 is regulated by a second LED controller 205. It is understood that the functions of the first LED controller 165 and the second LED controller 205 may be performed by a single controller. The document light source 140 serves to illuminate portions of a document which do not contain the subject hologram. The LEDs 195 of the document light source may be emit while light, infrared light, ultra-violet light or combinations thereof. FIG. 3 shows a combination of white light LEDS 195-1 and infrared, ultra-violet and other types of LEDS 195-2.

The imaging platform 150 retains a subject document in place during the imaging process. Alignment and/or rotational controls (not shown) provide means for manipulating the position of the document. The imaging platform 150 is designed to accommodate different types and sizes of documents.

Figure 4:
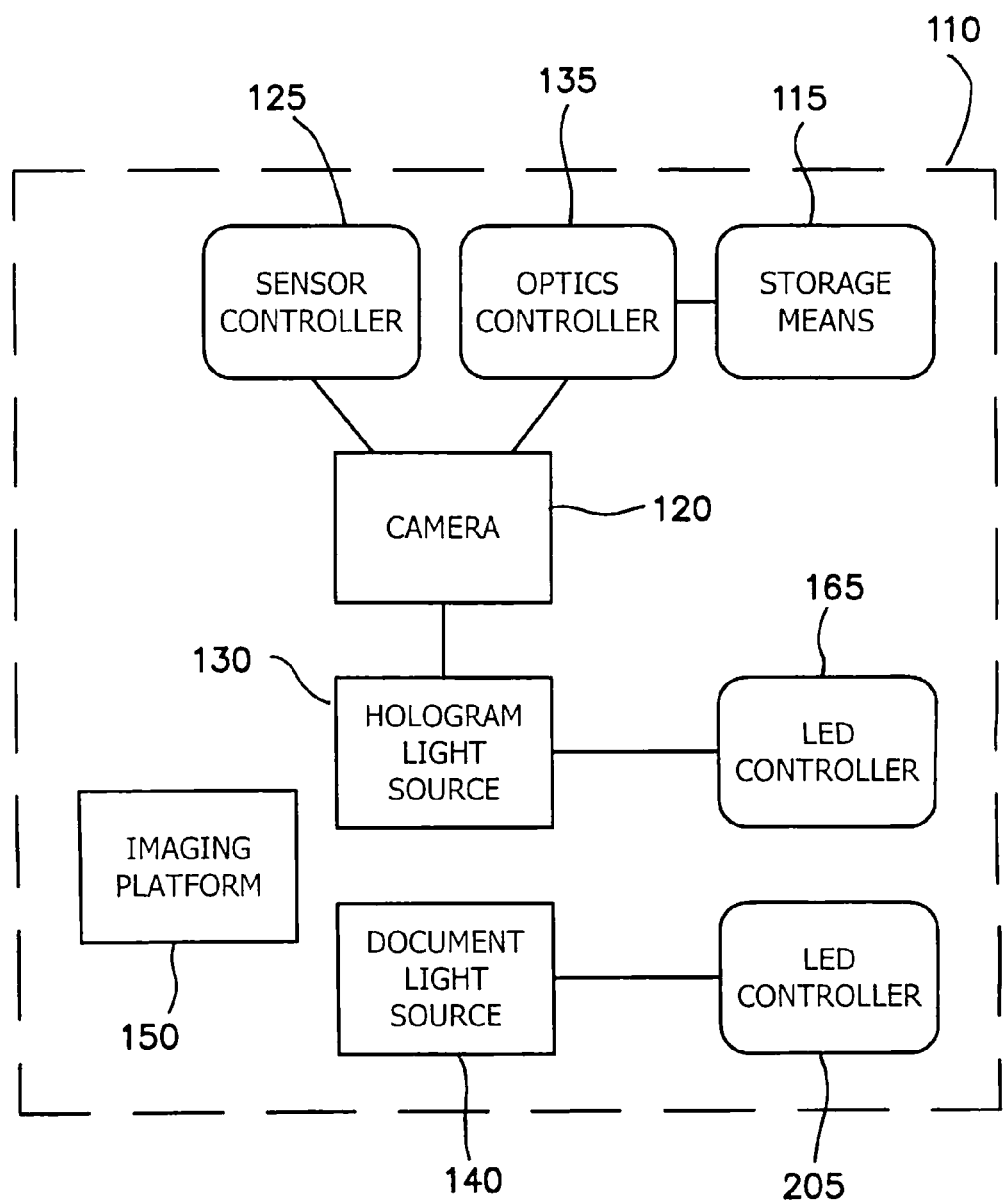
FIG. 4 shows a block diagram of the first embodiment of the present invention.

FIG. 4 shows a block diagram of the first embodiment of the present invention. The housing 110 contains the camera 120 which communicates with the sensor controller 125 and optics controller 135, hologram light source 130 and first LED controller 165, document light source 140 and second LED controller 205 and imaging platform 150.

In the first embodiment, the camera 120, hologram light source 130, document light source 140 and imaging platform 150 are each attached to the imaging device housing 110. The camera 120 is attached to the housing 110 such that camera 120 may be positioned with respect to the subject document. Both the hologram light source 130 and document light source 140 may be adjusted in both the vertical and horizontal planes. In addition, the imaging platform 150 may also be adjusted within the imager housing 110. In an alternative embodiment, the camera 120 and other components may be positioned outside the confines of the housing 110 and defined imaging chamber 150 as long as they are able to perform the desired functions.

Each of the controllers disclosed above are pre-programmed to perform the proper desired functions. For example, the first LED controller 165 is pre-programmed to regulate the state and intensity of the LEDs 155.

Figure 5:
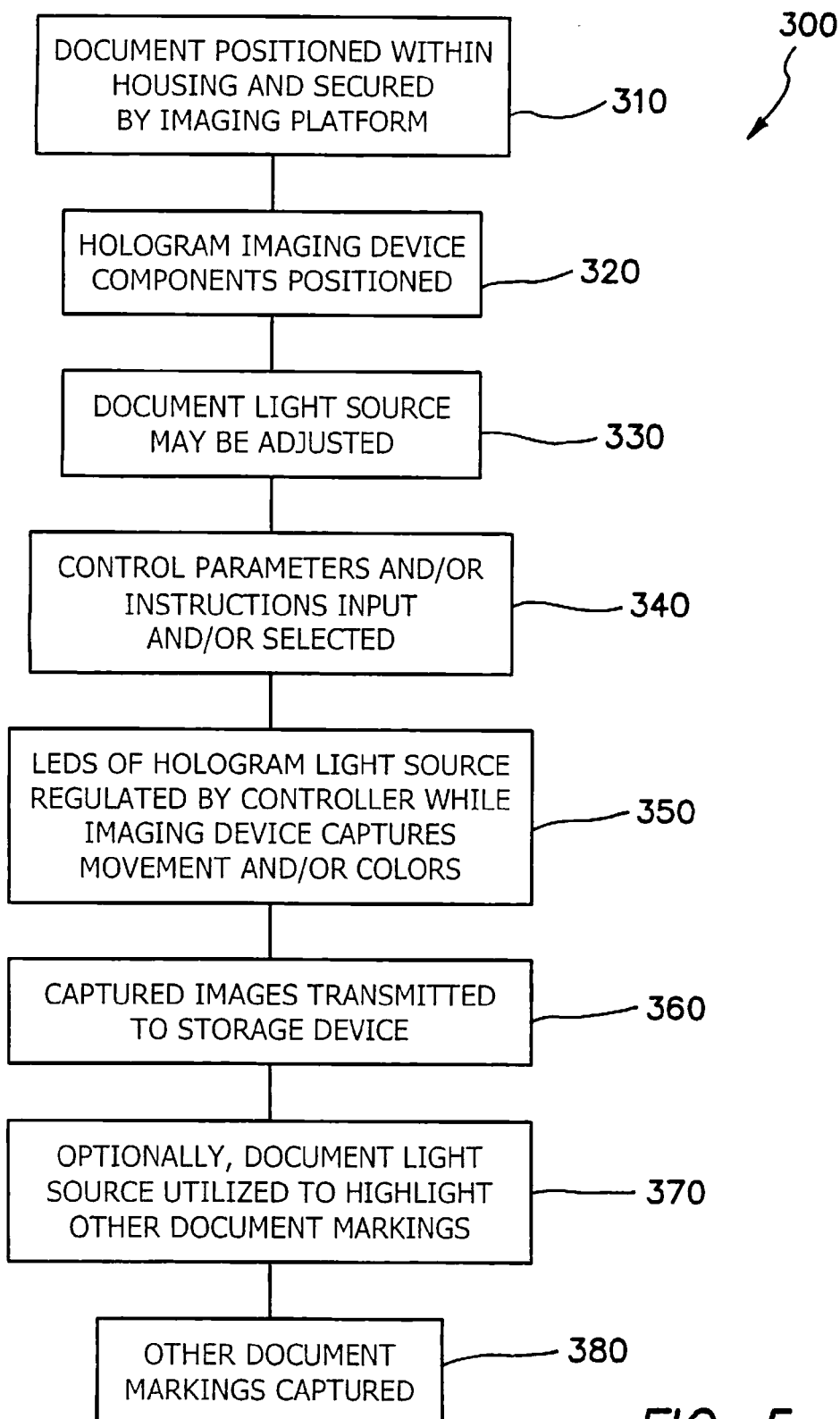
FIG. 5 shows a flow chart detailing one method of operating the first embodiment of the present invention.

FIG. 5 shows a flow chart 300 detailing a method of utilizing the hologram imager 100. At step 310, a document is positioned within the imager housing 110 and held in place on the image platform 150. The document is positioned such that the hologram or other document marking is positioned beneath the camera 120 and near the focal point of the LEDs 155 forming the hologram light source 130. Then, at step 320, the camera 120, hologram light source 130, document light source 140 and image platform 150 are positioned accordingly. At step 330, a user may adjust the document light source 140. At step 340, the user, via the user interface, selects or inputs the proper sequence of lighting events to capture individual hologram images. A multitude of sequences are pre-programmed and/or stored in the first LED controller 165 or in a memory device in communication with the first LED controller 165. Alternatively, the sequences may be downloaded from a host. At step 350, the LEDs 155 of the hologram light source 130 are each sequentially turned on and off, and the intensity of the LEDs in the on position is adjusted, by the first LED controller 165 while the camera 120 simultaneously captures individual images of the hologram and/or its colors generated by the sequentially controlled LEDs 155. At step 360, the captured images are transmitted to a storage device, such as a hard drive, server or similar device. The individual captured images provide images of the hologram and/or its colors for verifying the authenticity of the hologram. At step 370, the user may utilize the document light source 140 to illuminate other document markings which the camera 120, at step 380, may then be used to capture.

Although the invention has been described in detail with reference to several embodiments, additional variations and modifications exist within the scope and spirit of the invention as described and defined in the following claims.

I claim:

1. A hologram imaging device comprising:
   a housing;
   an image capturing device;
   a first light source comprising a plurality of illumination devices arranged in a semicircular pattern;
   a second light source comprising a plurality of illumination devices;
   an imaging platform; and
   a user interface permitting a user to select or input control parameters for the first light source and/or image capturing device.

2. The hologram imaging device of claim 1 wherein the housing is fabricated of an opaque material.

3. The hologram imaging device of claim 1 wherein the image capturing device is a camera.

4. The hologram imaging device of claim 1 wherein the first light source is adjustable.

5. The hologram imaging device of claim 1 wherein the plurality of illumination devices of the first light source are light emitting diodes.

6. The hologram imaging device of claim 1 wherein the second light source is adjustable.

7. The hologram imaging device of claim 1 wherein the plurality of illumination devices of the second light source are light emitting diodes.

8. The hologram imaging device of claim 7 wherein the light emitting diodes emit infrared light, ultra-violet light and/or white light.

9. The hologram imaging device of claim 1 wherein a hologram to be imaged is placed at a focal point of the arc-like pattern of the plurality of illumination devices of the first light source.

10. The hologram imaging device of claim 1 wherein the imaging platform is adjustable.

11. The hologram imaging device of claim 1 wherein the control parameters include sequential on/off positions and intensities of each illumination device of the first light source.

12. A hologram imaging device comprising:
    an opaque housing;
    a camera;
    a hologram light source comprising a plurality of illumination devices mounted on an adjustable frame, said illumination devices mounted in a curved pattern;
    a document light source comprising a plurality of illumination devices mounted on an adjustable frame member;
    an imaging platform; and
    a user interface permitting a user to select or input instructions for the first light source and/or camera.

13. The hologram imaging device of claim 12 wherein the instructions regulate sequential on/off positions and intensities of each illumination device of the hologram light source.

14. The hologram imaging device of claim 12 wherein the plurality of illumination devices of the hologram light source are light emitting diodes.

15. The hologram imaging device of claim 12 wherein the plurality of illumination devices of the document light source are light emitting diodes.

16. The hologram imaging device of claim 15 wherein the light emitting diodes emit infrared light, ultra-violet light and/or white light.

17. The hologram imaging device of claim 16 wherein the imaging platform is adjustable.

18. The hologram imaging device of claim 12 wherein a hologram to be imaged is placed at a focal point of the pattern of the illumination devices of the first light source.

19. A method of capturing a holographic image comprising:
    securing a document, incorporating a hologram, to an imaging platform wherein said imaging platform is positioned beneath an image capturing device;
    adjusting a position of a hologram light source comprising a plurality of illumination devices mounted in a semicircular arrangement;
    activating the one or more illumination devices of the hologram light source in a pre-established sequential manner to generate images and/or colors of the hologram while simultaneously activating the image capturing device to capture the images and/or colors of the hologram; and
    adjusting a position of a document light source.

20. The method of claim 19 further comprising transmitting the captured images to a storage device in communication with the image capturing device.

21. The method of claim 19 further comprising securing the document to the imaging platform such that the hologram is positioned at a focal point of the semicircular arrangement of the plurality of illumination devices comprising the hologram light source.

22. The method of claim 19 further comprising selecting or inputting control parameters for the hologram light source and/or image capturing device.

* * * * *